US006526175B2

(12) United States Patent
Sodagar et al.

(10) Patent No.: US 6,526,175 B2

(45) **Date of Patent: *Feb. 25, 2003**

(54) APPARATUS AND METHOD FOR PACKETIZING SIGNIFICANCE-BASED INFORMATION

(75) Inventors: Iraj Sodagar, North Brunswick, NJ (US); Bing-Bing Chai, Plainsboro, NJ (US)

(73) Assignees: Sarnoff Corporation, Princeton, NJ (US); Sharp Kabushiki Kaisha, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/143,780

(22) Filed: Aug. 31, 1998

(65) Prior Publication Data

US 2002/0009232 A1 Jan. 24, 2002

Related U.S. Application Data

(60) Provisional application No. 60/097,156, filed on Aug. 19, 1998, and provisional application No. 60/091,475, filed on Jun. 30, 1998.

(51) Int. Cl.[7] .......................... G06K 9/46; H04L 12/28

(52) U.S. Cl. ....................................... 382/240; 370/389

(58) Field of Search ................................ 382/232, 234, 382/236, 238, 240, 251; 348/461, 462, 387; 370/389, 401, 468, 498

(56) References Cited

U.S. PATENT DOCUMENTS 5,315,670 A * 5/1994 Shapiro ...................... 382/232
5,321,776 A * 6/1994 Shapiro ...................... 382/232
5,412,741 A * 5/1995 Shapiro ...................... 382/232
5,563,960 A * 10/1996 Shapiro ...................... 382/239
5,598,415 A * 1/1997 Nuber et al. ................ 370/474
5,856,973 A * 1/1999 Thompson .................. 370/389
5,995,146 A * 11/1999 Rasmussen ................. 348/385
6,011,587 A * 1/2000 Sakazawa et al. .......... 348/387

FOREIGN PATENT DOCUMENTS

EP 0 860 991 A1 8/1993
WO WO 98/10591 3/1998
WO WO 98/11728 3/1998

OTHER PUBLICATIONS

Rogers et al., Robust wavelet zerotree image compression with fix–length packetization, IEEE, pp. 418–427, Mar. 30, 1998.*

(List continued on next page.)

*Primary Examiner*—Andrew W. Johns
*Assistant Examiner*—Duy M. Dang
(74) *Attorney, Agent, or Firm*—W. J. Burke

(57) ABSTRACT

An apparatus and a concomitant method for packetizing significance-based information to improve error resilience is disclosed. Significance-based information comprises "coefficient significance information". Within each packet, the "coefficient significance information" are coded first into a first or front portion of the packet and then the "coefficient values" are coded into a second or back portion of the packet.

9 Claims, 5 Drawing Sheets

400

START 405

GENERATE A PACKET HEADER 410

GENERATE A PACKET PAYLOAD HAVING WAVELET COEFFICIENT SIGNIFICANCE INFORMATION IN A FIRST PORTION OF THE PAYLOAD 420

INSERT A MARKER AFTER THE FIRST PORTION OF THE PAYLOAD 425

INSERT WAVELET COEFFICIENT VALUES IN A SECOND PORTION OF THE PAYLOAD 430

END 440

OTHER PUBLICATIONS

Rogers et al., Wavelet zerotree image compression with packetization, IEEE, vol. 5, No. 5, pp. 105–107, May 1998.*

Shapiro, Jerome M., Embedded image coding using zerotree of wavelet coefficients, IEEE, vol. 41, No. 12, pp. 3445–3462, Dec. 1993.*

International Search Report corresponding to PCT/US99/14833.

Rogers J K Et Al: "Robust wavelet zerotree image compression with fixed–length packetization", Proceedings DCC '98 Data Compression Conference (Cat. No. 98TB100225), Porceedings DCC '98 Data Compression Conference, Snowbird, UT, USA, Alamitos, CA, IEEE Comput. Soc, USA, pp.(S) 418–427 XP0021183741SBN: 0–8186–8406–2 sections 1,2,4.

Creusere CD: "A New Method of Robust Image CO Mpression based on the Embedded Zerotree Wavelet Algorithm" IEEE Transactions on Image Processing, vol. 6, No. 10, Oct. 1, 1997, pp. 1436–1442, XP000702095 ISSN: 1057–7149 the whole document.

Kozintsev I Et al: "Efficient Hygrid Framework for Wireless Image Transmission" Conference, Phoenix, Arizona, Nov. 3–8, 1997, VOL. vol. 2, pp.(S) 1037–1041, Institute of Electrical and Electronic Engineers XP0900737689ISBN: 0–7803–4199–6 section 3.1. Source Coding.

* cited by examiner $20_1$ $0_2$ $3_7$ $5_{12}$ $0_{17}$ $-2_3$ $0_4$ $0_8$ $0_9$ $0_5$ $0_6$ $0_{10}$ $0_{11}$ $1_{13}$ $0_{14}$ $0_{18}$ $0_{19}$ $0_{15}$ $0_{16}$ $0_{20}$ $0_{21}$

FIG. 3

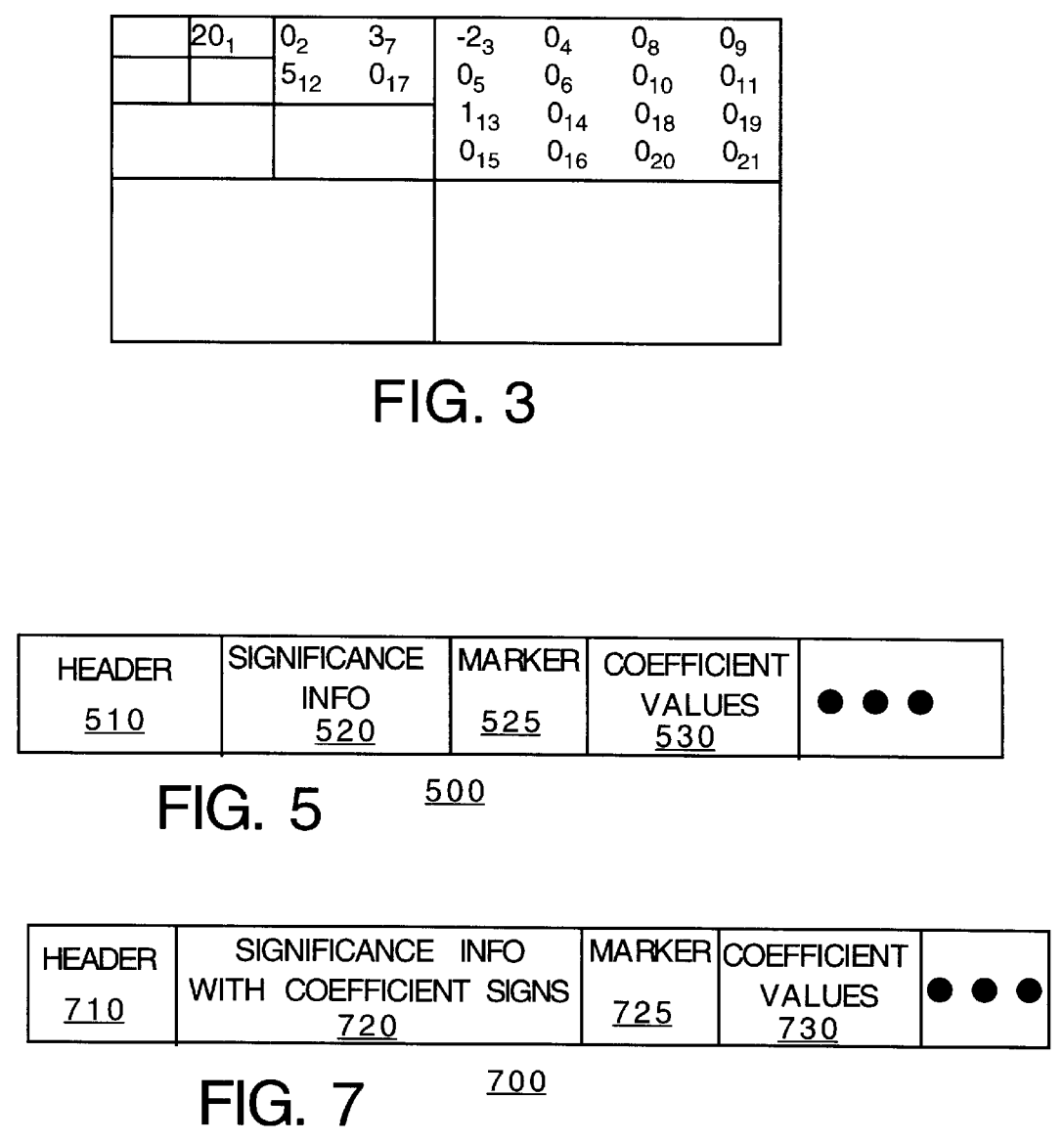

HEADER 510

SIGNIFICANCE INFO 520

MARKER 525

COEFFICIENT VALUES 530

HEADER 710

SIGNIFICANCE INFO WITH COEFFICIENT SIGNS 720

MARKER 725

COEFFICIENT VALUES 730

APPARATUS AND METHOD FOR PACKETIZING SIGNIFICANCE-BASED INFORMATION

This application claims the benefit of U.S. Provisional Application No. 60/091,475 filed on Jun. 30, 1998 and U.S. Provisional Application No. 60/097,156 filed on Aug. 19, 1998, which are herein incorporated by reference.

The invention relates to a packet format in the field of digital multimedia communications. More particularly, the invention relates to a packet format for packetizing "significance-based" information to improve error resilience.

BACKGROUND OF THE DISCLOSURE

In the field of digital multimedia communications, data streams carrying video, audio, timing and control data are packaged into various "packets". Generally, a packet is a group of binary digits that include data and control elements which are switched and transmitted as a composite whole. The data, control elements and other information are arranged in various specific formats.

Examples of such formats are disclosed in the ISO/IEC international Standards 11172 and 13818 (generally referred to as MPEG-1 and MPEG-2). In general, MPEG defines a packet as consisting of a header followed by a number of contiguous bytes (payload) from an "elementary data stream". An elementary stream is simply a generic term for one of the coded video, coded audio or other coded bitstreams. More specifically, an MPEG-2 "transport stream" packet comprises a header, which may be four (4) or more bytes long with a payload having a maximum length of 184 bytes. Transport stream packets are part of one or more programs which are assembled into a transport stream. The transport stream is then transmitted over a channel with a particular transfer rate.

However, transmission of packets over a noisy communication channel, e.g., wireless communication, may cause corruption in the packets received by a receiver/decoder. Furthermore, some data streams or bitstreams carry compressed data that are correlated in a manner such that partial loss of a packet may cause the receiver/decoder to discard the entire packet. Namely, compression methods are useful for representing information as accurately as possible with a minimum number of bits and thus minimizing the amount of data that must be stored or transmitted. To further increase compression efficiency, some compression methods employ "significance-based" information, e.g., a significance map-value model, to indicate to a receiver/decoder the significance of the transmitted information or absence of transmitted information. The "significance-based" information is often previously defined, e.g., using symbols, such that the receiver/decoder is able to decipher additional information from the transmitted information. However, the loss of compressed data such as "significance-based" information often results in substantial errors when a receiver/decoder attempts to decompress or decode the corrupted data.

For example, a useful compression technique appears in the Proceedings of the International Conference on Acoustics, Speech and Signal Processing, San Francisco, Calif. March 1992, volume IV, pages 657–660, where there is disclosed a signal compression system which applies a hierarchical subband decomposition, or wavelet transform, followed by the hierarchical successive approximation entropy-coded quantizer. A wavelet pyramid, also known as critically sampled quadrature-mirror filter (QMF) subband representation, is a specific type of multiresolution hierarchical subband representation of an image. A wavelet pyramid was disclosed by Pentland et al. in Proc. Data Compression Conference Apr. 8–11, 1991, Snowbird, Utah. A QMF subband pyramid has been described in "Subband Image Coding", J. W. Woods ed., Kluwer Academic Publishers, 1991 and I. Daubechies, *Ten Lectures on Wavelets,* Society for Industrial and Applied Mathematics (SIAM): Philadelphia, Pa., 1992.

Wavelet transforms are applied to an important aspect of image coding: the coding of a binary map (a wavelet tree) indicating the locations of the non-zero values, otherwise known as the significance map of the transform coefficients. Typically, a large fraction of the bit budget must be spent on encoding the significance map. It follows that a significant improvement in encoding the significance map translates into a significant improvement in the compression of information preparatory to storage or transmission.

To accomplish this task, a new structure called a zerotree has been developed. A wavelet coefficient is said to be insignificant with respect to a given threshold T, if the coefficient has a magnitude less than T. The zerotree is based on the hypothesis that if a wavelet coefficient at a coarse scale is insignificant with respect to a given threshold T, then all wavelet coefficients of the same orientation in the same spatial location at finer scales are likely to be insignificant with respect to T.

More specifically, in a hierarchical subband system, with the exception of the highest frequency subbands, every coefficient at a given scale can be related to a set of coefficients at the next finer scale of similar orientation according to a structure called a wavelet tree. The coefficients at the coarsest scale will be called the parent nodes, and all coefficients corresponding to the same spatial or temporal location at the next finer scale of similar orientation will be called child nodes.

Given a threshold level to determine whether or not a coefficient is significant, a node is said to be a ZEROTREE ROOT if 1) the coefficient at a node has an insignificant magnitude, 2) the node is not the descendant of a root, i.e., it is not completely predictable from a coarser scale, and 3) all of its descendants are insignificant. A ZEROTREE ROOT is encoded with a special symbol indicating that the insignificance of the coefficients at finer scales is completely predictable. To efficiently encode the binary significance map, a plurality of symbols are entropy coded: ZEROTREE ROOT, VALUED ZEROTREE ROOT, ISOLATED ZERO, and two non-zero symbols, POSITIVE SIGNIFICANT and NEGATIVE SIGNIFICANT.

Unfortunately, the loss of data in a packet associated with the significance map, i.e., the loss of a symbol for a node in a wavelet tree, will often cause a significant error or loss of data. Therefore, there is a need in the art for an apparatus and method for packetizing significance-based information to improve error resilience, regardless of the packet protocol that is employed.

SUMMARY OF THE INVENTION

The present invention is an apparatus and a concomitant method of packetizing significance-based information to improve error resilience. More specifically, in one embodiment, the significance-based information is wavelet-based information that comprises "coefficient significance information" (e.g., zerotree symbols) and "coefficient values". Within each packet, the "coefficient significance information" are coded first into a first or front portion of the packet and then the "coefficient values" are coded into a second or back portion of the packet.

More specifically, the present invention organizes the bitstream in a manner such that the "coefficient significance information" for all pixels in the same packet (or within a texture unit) are coded first, followed by a resynchronization marker (e.g., RESYNCH), and then the coefficient values of all nonzero pixels in the packet (or a texture unit).

Alternatively, in a second embodiment, the "coefficient significance information" and the signs (positive or negative) of the coefficient values are coded first, followed by a resynchronization marker (e.g., RESYNCH), and then the absolute coefficient values of all nonzero pixels in the packet (or a texture unit).

The present coding method and packet structures provide error resilience. Namely, if an error occurs in the "value portion" of the packet (or a texture unit), the receiver/decoder can still recover at least the coefficient significance information, e.g., the zerotree symbols, for all pixels in the packet (or a texture unit).

BRIEF DESCRIPTION OF THE DRAWINGS

The teachings of the present invention can be readily understood by considering the following detailed description in conjunction with the accompanying drawings, in which:

FIG. 3 is a schematic illustration of an 8×8 wavelet block having a packet (or texture unit);

FIG. 5 illustrates a block diagram of the packet structure of the present invention;

FIG. 7 illustrates a block diagram of an alternate packet structure of the present invention.

To facilitate understanding, identical reference numerals have been used, where possible, to designate identical elements that are common to the figures.

DETAILED DESCRIPTION

Figure 1:
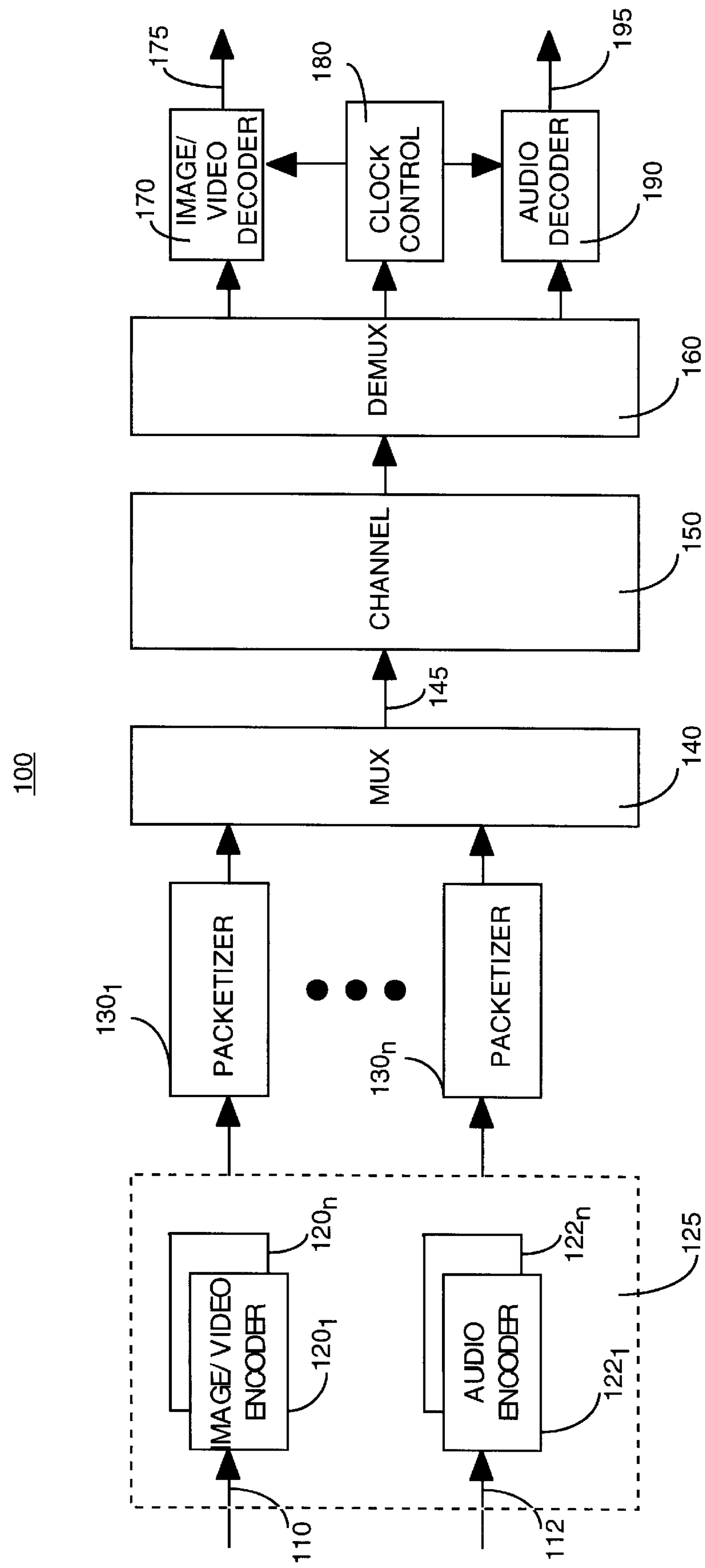
FIG. 1 depicts a block diagram of a simplified packet stream system of the present invention.

FIG. 1 depicts a block diagram of a simplified structure of a packet stream system 100 of the present invention. For illustration, a data stream such as a "transport stream" as defined in accordance with the MPEG standards is used in the packet stream system illustrated in FIG. 1. Although the present invention is described below using the transport stream as an example, those skilled in the art will realize that the present invention can be applied to any packet streams, e.g., an MPEG "program stream" or any other packet streams in accordance with other formats. Furthermore, although the present invention is described below using the term "stream", it should be understood that the various operations described below may be performed on the entire stream or portion thereof.

System 100 includes an image/video encoder 120 for receiving and encoding video data 110 into an elementary video bitstream. The video encoder 120 is an encoder capable of generating significance-based information. The image/video encoder 120 may be a single image encoder, e.g., a Joint Photographic Experts Group (JPEG) encoder, GIF, PICT, and the like, or an encoder for an image sequence (video), e.g., a block-based or wavelet-based image encoder operating in accordance with an MPEG standard. Throughout this disclosure the terms image sequence, images, and video are used interchangeably. In its broadest sense, the invention operates in cooperation with any form of image or image sequence encoder that would benefit from the present packet structures to provide error resilience.

One example of such an encoder is the Sarnoff Very Low Bit Rate (VLBR) encoder, which is disclosed and claimed in U.S. Pat. No. 5,764,805 (issued on Jun. 9, 1998), and is herein incorporated by reference. Other examples of such encoders are disclosed in U.S. patent application entitled "Apparatus And Method For Encoding Zerotrees Generated By A Wavelet-Based Coding Technique" (filed on Oct. 24, 1996 with Ser. No. 08/736,114), which is herein incorporated by reference.

Similarly, the system also includes an audio encoder 122 for receiving and encoding audio data 112 into an elementary audio bitstream. However, those skilled in the art will realize that a plurality of image/video encoders $\mathbf{120}_n$ and audio encoders $\mathbf{122}_n$ can be employed to produce a plurality of elementary bitstreams. In fact, the plurality of video and audio encoders can be collectively represented by a server 125, which may employ various encoders and/or may simply contain a plurality (or a library) of stored elementary streams in various storage media. Generally, the output of such server contains interleaved program streams.

In turn, these bitstreams are sent to packetizers 130 of the present invention, where the elementary bitstreams are converted into packets. Information for using the packets independently of the transport stream may be added when the packets are formed. Thus, non-audio/video data are allowed, but they are not shown in FIG. 1.

The packets are received and multiplexed by the transport stream multiplexer 140 to produce a transport stream 145. Packets constructed from elementary streams that form a program (a group of "Packet Identifiers" (PIDs) with associated video and audio data) generally share a common time base. Thus, the transport stream may contain one or more programs with one or more independent time bases, where the time bases are used for synchronized presentation. The time bases of different programs within a transport stream may be different.

The transport stream 145 is transmitted over a transmission channel 150, which may further incorporate separate channel specific encoder and decoder (not shown). Next, the transport stream 145 is demultiplexed and decoded by a transport stream demultiplexor 160, where the elementary streams serve as inputs to video decoder 170 and audio decoder 190, whose outputs are decoded video signals 175 and audio signals 195, respectively.

Furthermore, timing information is also extracted by the transport stream demultiplexor 160 and delivered to clock control 180 for synchronizing the video and audio decoders with each other and with the channel. Synchronization of the decoders with the channel is accomplished through the use of the "Program Clock Reference" (PCR) in the transport stream. The PCR is a time stamp encoding the timing of the bitstream itself and is used to derive the decoder timing.

As discussed above, the packetizer 130 organizes the bitstream from the encoder into packets for transmission. If the transmission channel 150 is noisy, the transmitted packets can be corrupted or partially lost. Although the present invention describes a method for manipulating a bitstream to form a particular packet structure within a packetizer 130, it should be understood that this operation can also be performed within the encoder 120 itself. As such, the implementation of the present invention is a matter of designer choice.

As such, error resilience is particularly important for packets carrying significance-based information. Significance-based information is broadly defined to include information that is generated to indicate the significance of the transmitted information and/or, in some situations, the absence of the transmitted information. Typically, the significance-based information can be derived from the original data, e.g., an original image.

An example of an encoding process that can benefit from implementing significance-based information is wavelet-based information. Wavelet-based information is broadly defined to include information resulting from having undergone a wavelet transformation, e.g., an image is transformed into a plurality of wavelet coefficients with or without "coefficient significance information" associated with the wavelet coefficients. Coefficient significance information is broadly defined to include information associated with the magnitude or value of one or more wavelet coefficients. Due to the correlation within the wavelet-based information, significance-based information is used to exploit such correlation to further increase coding and compression efficiency. Although the present invention is described below using wavelet-based information as an illustration, it should be understood that other encoding/decoding methods that employ significance-based information can also benefit from the present invention.

Zerotree encoding is an example of an encoding method that employs wavelet transform to generate a plurality of wavelet coefficients with "coefficient significance information" in the form of a significance map. The significance map is entropy coded using a plurality of symbols: ZEROTREE ROOT (ZTR), VALUED ZEROTREE ROOT (VZTR), ISOLATED ZERO (IZ) and VALUE. A ZEROTREE ROOT symbol denotes a coefficient that is the root of a zerotree. A VALUED ZEROTREE ROOT symbol is a node where the coefficient has a non-zero value and all four children are ZEROTREE ROOTS. An ISOLATED ZERO symbol identifies a coefficient with zero value, but with some descendant somewhere further along with a nonzero. Furthermore, if a leave has a zero value, it can also be assigned as an ISOLATED ZERO. A VALUE symbol identifies a coefficient with a non-zero value, but also with some descendant somewhere further along the tree that has a non-zero value.

Figure 2:
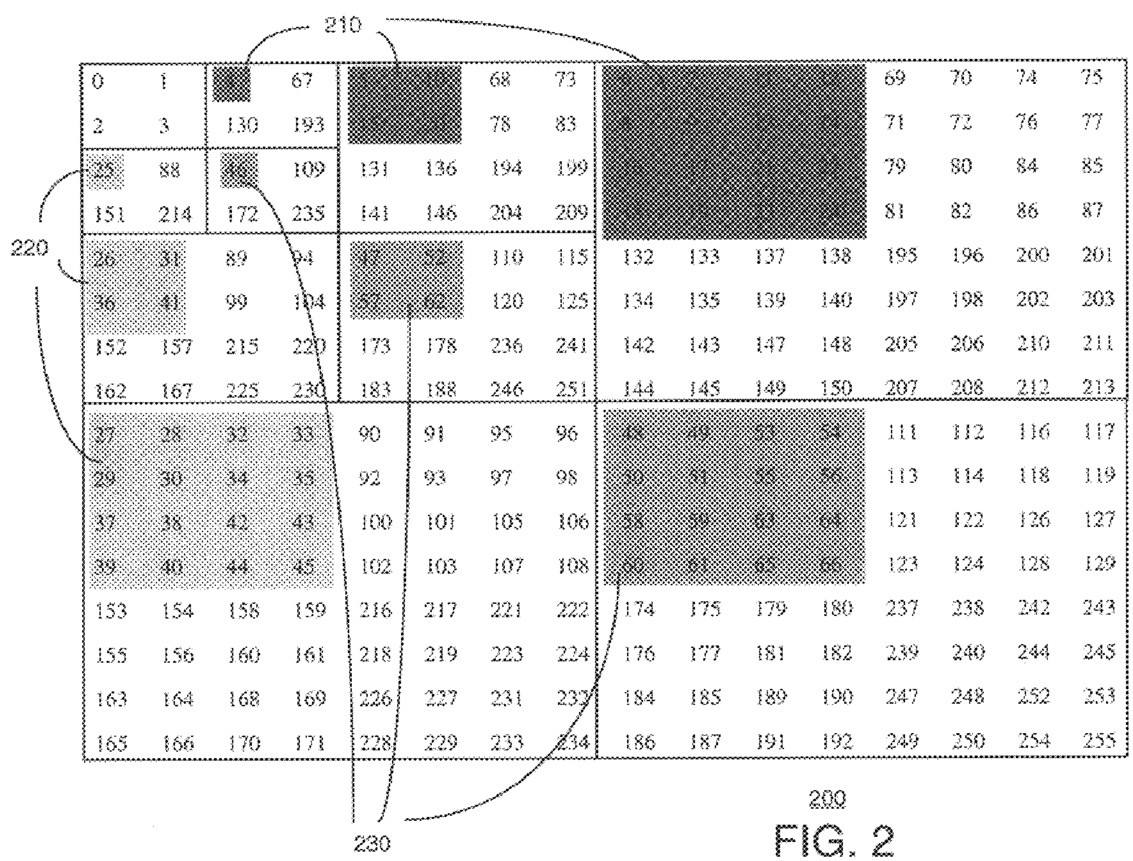
FIG. 2 is a schematic illustration of parent-child dependencies of subbands in an image decomposed to three scales within a wavelet tree having a plurality of texture units.

Wavelet-based information can be packetized into units called "texture packets" for error resilience. A texture packet consists of one or more encoding units, named "texture units". Texture unit can be selectively defined to comprise one or more resolutions for a particular spatial location, e.g., a pixel or a group of pixels. For example, in MZTE (Multiscale Zerotree Entropy Encoding, as disclosed in U.S. patent application Ser. No. 09/107,544, filed on Jun. 30, 1998 and herein incorporated by reference) tree depth scan order, the texture units are as depicted in the wavelet tree 200 of FIG. 2. Namely, the shaded areas consist of three texture units 210, 220 and 230, each of which has a different shade. It should be noted that the numbers in the wavelet tree 200 describe the scan order in which the wavelet coefficients (significant symbols and coefficient values) are packetized. As such, if the texture units 210, 220 and 230 are packetized into a single packet, then the packet is referred to as a texture packet of the wavelet tree 200. Thus, the size, shape and levels of resolution can be selectively defined for a texture unit in accordance with a particular application.

One method of packetizing a packet (or a texture unit) of an input image is to packetize a significant symbol, e.g., a zerotree symbol, immediately followed by its value if it is a nonzero wavelet coefficient. For example, assume an 8×8 wavelet block has a packet (or a texture unit) as shown in FIG. 3. The subscripts of the wavelet coefficients in FIG. 3 illustrate the scan order. Thus, the bitstream for the texture unit of FIG. 3 can be organized in a sequence as follows:

VAL, +20, IZ, VAL, −2, IZ, IZ, IZ, VZTR, +3, VAL, +5, VAL, +1, IZ, IZ, IZ, ZTR. (1)

A potential problem of the above method is that when an error occurs in a packet (or a texture unit), the information on the pixel or pixels can be lost completely. For example, the lost of the last term, ZTR, in the above sequence would cause the loss of information regarding the wavelet coefficients in scan order 17, 18, 19 , 20, and 21. Thus, the loss of a single symbol in the packet may cause significant loss of information, such that the receiver/decoder may elect to simply discard the entire packet.

An alternative approach to the above method is to reorganize the bitstream in a manner such that the zerotree symbols for all pixels in the same packet (or texture unit) are coded first, followed by a resynchronization marker (e.g., RESYNCH), and then the values of all nonzero wavelet coefficients in the packet (or texture unit). This packet format is illustrated in FIG. 5. The packet 500 comprises a packet header 510, a first portion 520 carrying coefficient significance information, a marker 525, and a second portion 530 carrying coefficient values. It should be understood that packet 500 may comprise one or more texture units. As such, packet 500 may comprise a plurality of one and second portions in accordance with a particular application.

For the example as shown in FIG. 3, the new bitstream can be organized in a sequence as follows:

VAL, IZ, VAL, IZ, IZ, IZ, VZTR, VAL, VAL, IZ, IZ, IZ, ZTR, RESYNCH, +20, −2, +3, +5, +1. (2)

In this packet format, if an error occurs after the RESYNCH marker (or "value portion") of the packet (or texture unit), then the receiver/decoder can, at minimum, recover the zerotree symbols for all wavelet coefficients in the packet (or texture unit). This feature is advantageous for all scalable (spatial or quality) wavelet based image/video compression where the wavelet coefficients are coded using a significance map-value model, e.g., the zerotree symbols from a coarser layer allows the continuation of decoding of the refinement layers. Furthermore, if the error occurs before the RESYNCH marker (or "symbol portion") of the packet (or texture unit), the decoder can still decode the values for the wavelet coefficients with successfully decoded zerotree symbols.

Additionally, in some situation, the decoder may still be able to recover a lost symbol if other symbols and values are successfully decoded in the packet or texture unit. For example, if the first symbol, VAL, in the above sequence (2) is lost, then the decoder can recover the lost symbol by remapping the decoded significance symbols and values to deduce the lost symbol. In this example, the decoder will be able to determine that the lost symbol is VAL, since a value +20 was decoded and at least one of the descendants from that node is nonzero.

In a second embodiment, the "coefficient significance information" and the signs (positive or negative) of the coefficient values are coded first, followed by a resynchronization marker (e.g., RESYNCH), and then the absolute coefficient values of all nonzero pixels in the packet (or a texture unit). More specifically, the bitstream is organized such that the zerotree symbols for all pixels in the same packet (or texture unit) are coded first with the signs of the wavelet coefficient values, followed by a resynchronization marker (e.g., RESYNCH), and then the absolute values of all nonzero wavelet coefficients in the packet (or texture unit). This packet format is illustrated in FIG. 7. The packet 700 comprises a packet header 710, a first portion 720 carrying coefficient significance information with the signs of wavelet coefficient values, a marker 725, and a second portion 730 carrying coefficient values. It should be understood that packet 700 may comprise one or more texture units. As such, packet 700 may comprise a plurality of one and second portions in accordance with a particular application.

For the example as shown in FIG. 3, the new bitstream can be organized in a sequence as follows:

VAL, +, IZ, VAL, −, IZ, IZ, IZ, VZTR, +, VAL, +, VAL, +, IZ, IZ, IZ, ZTR, RESYNCH, 20, 2, 3, 5, 1. (3)

In this packet format, if an error occurs after the RESYNCH marker (or "value portion") of the packet (or texture unit), then the receiver/decoder can, at minimum, recover the zerotree symbols for all wavelet coefficients and the signs of the wavelet coefficient values. This feature is advantageous, since it provides the decoder with more flexibility to implement various error recovery methods. For example, if the decoder has decoded the node symbol to be "VAL" and the coefficient value sign to be "+", but the decoder was unable to decode the actual coefficient value, then the decoder can still estimate a value for the node, e.g., +1. Depending on the error recovery methods employed by the decoder, having the knowledge of the signs of the coefficient values allows the decoder to make better estimation of the actual coefficient values.

Figure 4:
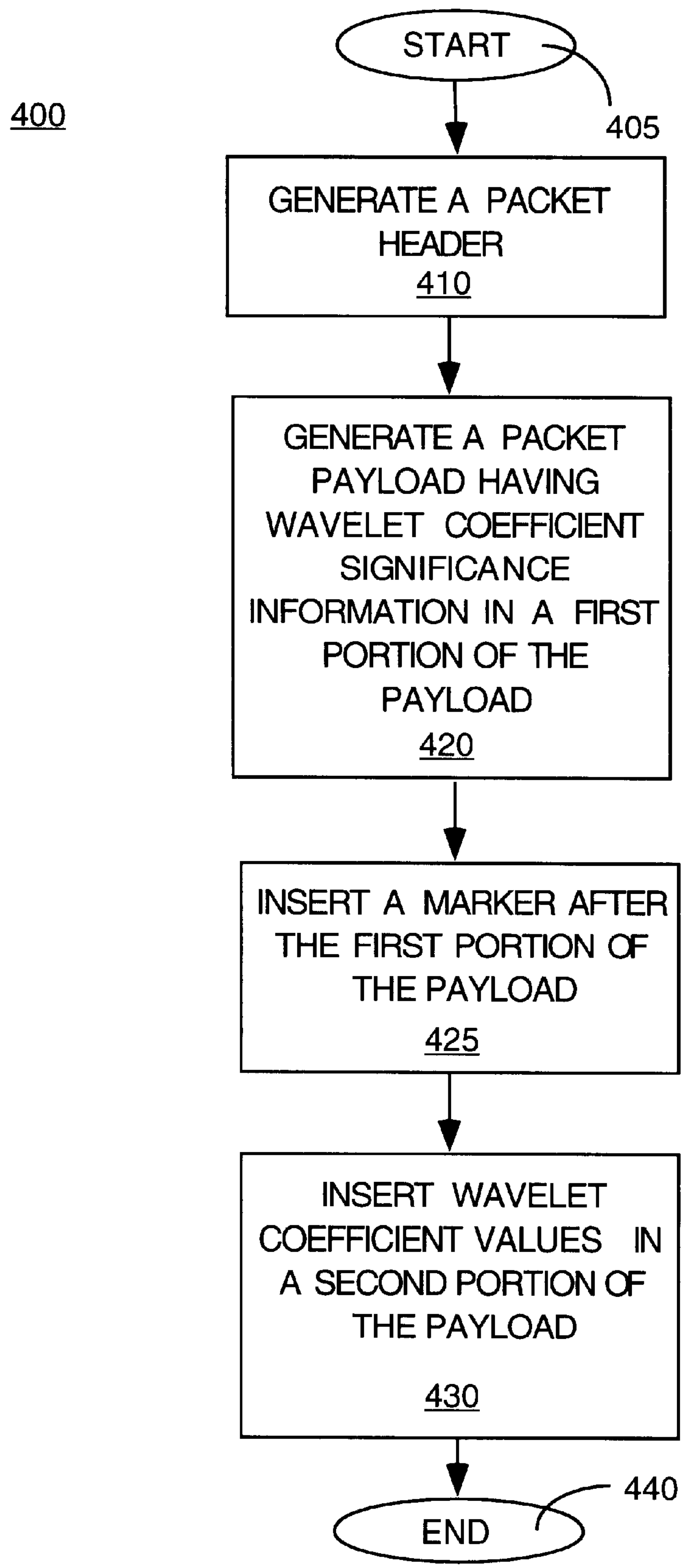
FIG. 4 depicts a flowchart of a method for coding significance-based information into a packet.

FIG. 4 illustrates a flowchart of a method 400 for organizing or coding significance-based information into a packet as discussed above. Namely, a bitstream or portion thereof from a wavelet encoder is organized into packets. Method 400 can be executed by the packetizer 130 in FIG. 1.

More specifically, method 400 starts in step 405 and proceeds to step 410 where a packet header is generated. The packet header may carry various information (such as texture unit numbers, picture type, source format, start of payload marker, etc.) to assist in the use and/or decoding of the packet.

In step 420, method 400 generates a packet payload having a first portion for holding coefficient significance information. Namely, if the encoder employs zerotree encoding, then the coefficient significance information contains zerotree symbols that are representative of the significance map. However, the present invention can be adapted to any wavelet-based encoding method that generates coefficient significance information. As such, the present invention is not limited to the zerotree symbols as described above.

Furthermore, in step 420, method 400 may optionally include the signs of the coefficient values in the first portion of the packet payload. This additional information can be used to increase error resilience as discussed above.

In step 425, method 400 inserts a marker after the coefficient significance information. This marker serves as a demarcation between coefficient significance information and coefficients values.

In step 430, method 400 inserts coefficient values in a second portion of the packet payload. If the signs of the coefficient values were optionally inserted into the first portion of the packet payload, then only the absolute coefficient values are inserted into the second portion of the packet payload. Method 400 ends in step 440.

Figure 6:
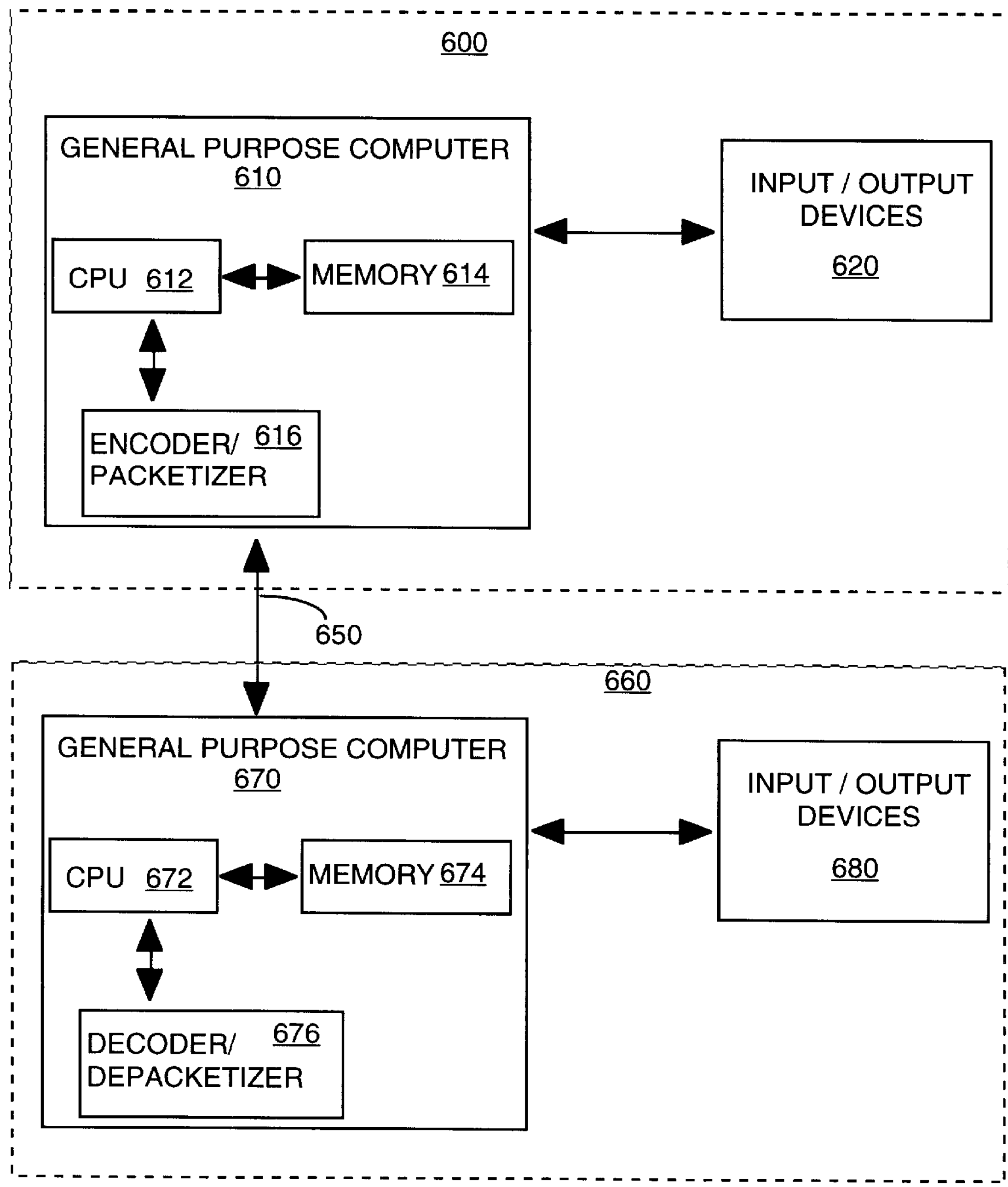
FIG. 6 illustrates a block diagram of an encoding system and a decoding system of the present invention.

FIG. 6 illustrates a block diagram of an encoding system 600 and a decoding system 660 of the present invention. The encoding system 600 comprises a general purpose computer 610 and various input/output devices 620. The general purpose computer comprises a central processing unit (CPU) 612, a memory 614 and an encoder/packetizer 616 for encoding and packetizing an image, video and/or audio signal.

In the preferred embodiment, the encoder/packetizer 616 is simply the video encoder 120, the audio encoder 122 and/or the packetizer 130 as discussed above in FIG. 1. It should be understood that the encoders and the packetizer can be implemented jointly or separately. The encoder/packetizer 616 can be physical devices which are coupled to the CPU 612 through a communication channel. Alternatively, the encoder/packetizer 616 can be represented by a software application (or a combination of software and hardware, e.g., using application specific integrated circuits (ASIC)), where the software is loaded from a storage medium, (e.g., a magnetic or optical drive or diskette) and operated by the CPU in the memory 614 of the computer. As such, the encoder/packetizer 616 of the present invention can be stored on a computer readable medium. In turn, the packets 500 and 700, which are generated by the encoder/packetizer 616, can also be stored on a computer readable medium, e.g., RAM memory, magnetic or optical drive or diskette and the like.

The computer 610 can be coupled to a plurality of input and output devices 620, such as a keyboard, a mouse, an audio recorder, a camera, a camcorder, a video monitor, any number of imaging devices or storage devices, including but not limited to, a tape drive, a floppy drive, a hard disk drive or a compact disk drive.

The encoding system is coupled to the decoding system via a communication channel 650. The present invention is not limited to any particular type of communication channel.

The decoding system 660 comprises a general purpose computer 670 and various input/output devices 680. The general purpose computer comprises a central processing unit (CPU) 672, a memory 674 and an decoder/depacketizer 676 for receiving and decoding a sequence of encoded images.

In the preferred embodiment, the decoder/depacketizer 676 is simply any decoders that are complementary to the encoder/packetizer 616 as discussed above for decoding the bitstreams generated the encoder/packetizer 616. The decoder 676 can be a physical device which is coupled to the CPU 672 through a communication channel. Alternatively, the decoder/depacketizer 676 can be represented by a software application which is loaded from a storage device, e.g., a magnetic or optical disk, and resides in the memory 674 of the computer. As such, any of complementary decoders of the encoder/packetizer 616 of the present invention can be stored on a computer readable medium.

The computer 660 can be coupled to a plurality of input and output devices 680, such as a keyboard, a mouse, a video monitor, or any number of devices for storing or distributing images, including but not limited to, a tape drive, a floppy drive, a hard disk drive or a compact disk drive. The input devices serve to allow the computer for storing and distributing the sequence of decoded video images.

Although various embodiments which incorporate the teachings of the present invention have been shown and described in detail herein, those skilled in the art can readily devise many other varied embodiments that still incorporate these teachings.

What is claimed is:

1. A data structure stored on a computer readable medium comprising:

a packet header; and a payload having a first portion for carrying wavelet-based information derived from applying a subband decomposition transformation comprising a plurality of zerotree symbols and a second portion for carrying a plurality of coefficient values.

2. The data structure of claim 1, wherein said first and second portions are separated by a marker.

3. The data structure of claim 1, wherein said first portion further carries signs of said coefficient values of said second portion and said coefficient values of said second portion carry absolute coefficient values.

4. The data structure of claim 3, wherein said first and second portions are separated by a marker.

5. A method for packetizing a bitstream, said method comprising the steps of:

a) generating a packet header;

b) generating a payload having a first portion for carrying wavelet-based information derived from applying a subband decomposition transformation comprising a plurality of zerotree symbols; and c) inserting a plurality of coefficient values into a second portion of said payload.

6. The method of claim 5, further comprising the step of inserting a marker between said first and second portions.

7. The method of claim 5, wherein said generating step (b) generates said payload having said first portion for carrying said wavelet-based information and signs of said coefficient values of said second portion; and wherein said inserting coefficient values step (c) comprises the step of inserting absolute coefficient values into said second portion.

8. A computer-readable medium having stored thereon a plurality of instructions, the plurality of instructions including instructions which, when executed by a processor, cause the processor to perform the steps comprising of:

a) generating a packet header;

b) generating a payload having a first portion for carrying wavelet-based information derived from applying a subband decomposition transformation comprising a plurality of zerotree symbols; and c) inserting a plurality of coefficient values into a second portion of said payload.

9. An apparatus for encoding an input image, said apparatus comprising:

means for encoding the input image into a bitstream, where said bitstream comprises wavelet-based information derived from applying a subband decomposition transformation and coefficient values; and means for packetizing said bitstream into at least one packet, where said packet comprises a packet header and a payload, wherein said payload has a first portion for carrying said wavelet-based information comprising a plurality of zerotree symbols and a second portion for carrying said coefficient values.

* * * * *